Patented Nov. 23, 1948

2,454,284

UNITED STATES PATENT OFFICE 2,454,284

COMPOSITION OF HALF-ESTER OF STYRENE-MALEIC ANHYDRIDE COPOLYMER AND A SOLVENT

Joseph S. Kirk, Seven Hills Village, Ohio, assignor to E. I. du Pont de Nemours & Company, Wilmington, Del., a corporation of Delaware No Drawing. Application January 19, 1944,
Serial No. 518,883

8 Claims. (Cl. 260—23)

This invention relates to the protection of metals and is more particularly directed to processes for coating metals and to film-forming compositions which employ a partial ester of a polymeric carboxylic acid.

It is an object of the present invention to provide processes and compositions for the protection of metals. It is a further object to provide compositions which may readily be applied to metals, as by spraying or brushing, and which will then protect the metal against the corrosive influences of atmospheric corrosion. It is a still further object to provide processes and compositions for the protection of metals and particularly iron and steel from salt spray, from air carrying various corrosive agents in so-called industrial atmospheres, and various similar types of corrosion. It is a still further object to provide processes and compositions adapted to protect unpainted metal objects during transportation and storage. Still further objects will become apparent hereinafter.

The foregoing and other objects of this invention are attained by covering a metal article with a film or coating of a partial ester of a polymeric carboxylic acid. It is preferred to use the half stearyl ester of a styrene-maleic anhydride hetero polymer.

More broadly it will be observed that the metal-protective compositions of the present invention are characterized by containing a multiplicity of carboxyl groups, by having attached side chains of organic groups containing more than eight carbon atoms, and by having a long-chain structure typical of linear polymeric materials.

Any metal such as magnesium, aluminum, copper, and zinc may advantageously be protected according to the present invention, but the principal use for the invention will be found in the protection of iron and steel. Iron and steel are peculiarly subject to atmospheric corrosion and rusting and it is important that the surfaces be protected during periods of storage and transportation. Motors and mechanical devices of all sorts require protection, for instance, if they are to be transported by ship.

According to the preferred practices of the invention there is employed the half stearyl ester of maleic anhydride-styrene interpolymer. The maleic anhydride-styrene polymer may first be prepared by such processes as those shown in Graves 2,205,882 and Voss and Dickhauser 2,047,398. The polycarboxylic acid thus prepared may then be partly esterified by reaction, for instance, with stearyl alcohol and it is preferred that about half the carboxyl groups be esterified.

Instead of using a polycarboxylic acid prepared by the reaction of maleic anhydride and styrene there may be used any of the polycarboxylic acids prepared by the reaction of a compound of the following formula:

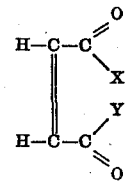

wherein X and Y stand for OH, O-alkyl, O-aryl or halogen or X and Y together stand for oxygen. Instead of the styrene, similarly, there may be used any organic compound capable of being polymerized and containing a single $=C-CH_2$. These compounds are specifically described in Voss and Dickhauser 2,047,398 and it seems unnecessary here to repeat in detail the disclosure therein given. It seems sufficient to point out that as typical of the materials which may be used instead of maleic anhydride there may be used for instance ethylene-alpha-beta-dicarboxylic acids such as maleic acid, fumaric acid, itaconic acid, citraconic acid, phenyl-maleic acid, benzyl-maleic acid, dibenzyl-maleic acid, ethyl-maleic acid. As examples of materials which may be used instead of the styrene there may be listed vinyl esters, vinyl ethers, vinyl halides, acrylic acid and its esters and the like. The reactants and their definition is, as has already been stated, well set out in the Voss and Dickhauser Patent 2,047,398 in the specification and in the claims.

More broadly there may be used polycarboxylic acids prepared as in the Graves Patent 2,205,882. The Graves patent shows compounds of the type just above discussed but additionally shows polycarboxylic acids derived more broadly by the polymerization of an alpha-unsaturated aliphatic carboxylic acid or still more broadly acidic polymeric materials in which the acidity is due to carboxyl groups however they are prepared. As has been noted above, the compounds suitable for use as metal-protective film-forming compositions are characterized by being linear polymeric materials, by containing a multiplicity of carboxyl groups, and by having attached chains of organic groups containing more than 8 carbon atoms. Many of the compositions of the Graves patent may therefore be used which supply a linear polymeric material containing a multiplicity of carboxyl groups and which can be treated to effect attachment of side chains as indicated.

Esterification of polymeric carboxylic acids may be effected to product products useful according to the present invention by using, preferably, a saturated aliphatic alcohol having from 12 through 18 carbon atoms. Mixtures of such alcohols may also be used and as illustrative of suitable alcohols there may be mentioned lauryl, Lorol, stearyl, and decyl.

The amount of alcohol to use in a particular case should be less than that required for complete esterification of the polymeric carboxylic acid. It will generally be preferred to use the "half-ester." Of course the ester need not be exactly one-half esterified and a range of, say, 40 to 60% esterification would be properly termed a half-ester. Partial esters for use according to the present invention may be more or less esterified than the half-ester depending in some measure upon the precise properties wanted in a particular instance. Thus with an increased esterification the products become less effective and more soluble in organic solvents. With less esterification the products become brittle and less effective.

Partial esters of the present invention may be used in admixture with carriers including other metal treating and rustproofing compositions and they may be applied in any desired manner. They may, for instance, be heated and applied, in admixture with a fatty acid, with vigorous rubbing to articles not too irregular in shape. Alternatively they may be applied in emulsions or in wax, lanolin, or petroleum media. It is preferred, however, simply to dissolve the partial esters in a suitable organic solvent and to apply by spraying or brushing the solution onto metal surfaces to be protected. Any solvent may be used and there may be suggested toluol, acetone, and aromatic hydrocarbons such as petroleum naphthas.

The partial ester can be used in widely varying amounts up to the limit of its solubility in a particular solvent but it will generally be found that from about, say, 5 to 30 percent solution will be most conveniently applied.

The half ester and the other compounds most desirable for use according to the present invention are not for the most part easily soluble even in organic solvents. However, if there is included a fatty acid of ten carbon atoms or more in the solution then a clear solution is obtained and much more of a half ester can be dissolved in a given solvent. For instance, without a fatty acid, about 5 to 20% of the half ester is all that can be put in solution while with a fatty acid as much as about 35% of the ester can be dissolved. The amount of fatty acid to employ will of course be varied depending upon the magnitude of effect desired but from about 5 to 20%, based upon the weight of esters, will ordinarily be found suitable. As examples of appropriate fatty acids there may be mentioned decanoic, lauric, palmitic, and stearic. Unsaturated fatty acids increase the solubility of the esters but they are not too desirable in rustproofing compositions.

Instead of using a fatty acid, the solubility may be increased by the use of sulfonated oils such as sulfonated neats foot oil or sulfonated cottonseed oil.

The metal protective polymeric compositions of the present invention may be used as such or they may be used in the form of various of their salts or addition compounds. Typically one may use them with good results as the lead salt or alternatively as the salt of any other metal.

In order that the invention may be better understood reference should be had to the following illustrative examples:

*Example I*

To a reaction vessel equipped with a condenser and stirrer there was added:

| | Parts by weight |
|---|---|
| Xylene | 466 |
| Stearyl alcohol | 133 |
| Styrene-maleic anhydride heteropolymer | 100 |

The mixture was brought to the boiling point of xylene, 141° C. The heating continued for one hour and 339 parts by weight of xylene were removed by distillation. The solution became clear amber and free from suspended particles.

An additional 156 parts by weight of xylene was added and heating continued at the boiling point until 50 parts by weight of xylene were removed. The resulting product was transferred to shallow pans and evaporated to dryness.

15 parts by weight of the dried partial ester thus produced was dissolved in 85 parts by weight of a mixture of equal parts by volume of acetone and toluol. When this solution was applied to bright steel surfaces it was found to give a coating that protected the surface against atmospheric corrosion.

*Example II*

Whereas in the above example the half ester was prepared by using one mol of stearyl alcohol for the styrene-maleic anhydride heteropolymer, the product of the present example contains a somewhat higher proportion of alcohol, there being used 1.2 mols of alcohol for each mol of polymer.

A polymer of styrene and maleic anhydride was prepared by reacting in a closed vessel equipped with condenser and stirrer,

| | Pounds |
|---|---|
| 50% styrene | 6.9 |
| Maleic anhydride | 3.24 |
| Xylene | 35.30 |

The above contents were heated to 99° C. and polymerization effected by adding 45.4 grams of benzoyl peroxide dissolved in 500 grams of xylene. The resultant white precipitated polymer was filtered free from excess xylene and used for subsequent esterification.

The above prepared polymer was charged into a reaction vessel equipped with mechanical agitation, reflux condenser and source of heat.

The esterification was accomplished in the following manner:

| | Pounds |
|---|---|
| Stearyl alcohol | 9.02 |
| Xylene | 4.00 | were charged into the reaction kettle and heated to 145–150° C. for 15 minutes to remove water, after which the reaction mass was cooled to 120° C. and 18.63 pounds of the filtered styrene-maleic anhydride polymer, containing 30.1% polymer, 69.9% xylene was charged into the kettle.

The temperature of the mass was raised to 140–145° and refluxed for three hours and 25 minutes at which time the reaction was considered essentially complete. The clear amber colored mass was transferred to shallow pans and xylene removed by drying over steam bath.

Fifteen grams of the above dried partial ester was dissolved in 85 grams of a 50-50 mixture of acetone and toluol and applied to bright steel surface. The steel surface was found to be extremely resistant to humid atmosphere and salt spray.

*Example III*

A lauryl half ester was prepared, by reacting in a reaction vessel under reflux for six hours the following:

| | Parts by weight |
|---|---|
| Maleic anhydride polymer | 20.0 |
| Lauryl alcohol | 19.0 |
| Toluol (approx.) | 100.0 |

During the course of the heating the maleic anhydride polymer, which is insoluble in toluol, gradually swelled, became gelatinous and finally dissolved to a clear amber solution. This product was tested as in previous examples for protection of steel against corrosion and was found to be extremely satisfactory.

*Example IV*

A product was prepared as in Example III but using decyl alcohol instead of lauryl alcohol. 16 parts by weight of decyl alcohol were used for each 20 parts by weight of polymer. The product was found very satisfactory for the preparation of corrosion resistant coatings for metals.

*Example V*

A protective composition containing the stearyl partial ester of styrene-maleic anhydride of Example II was made up using additionally a lead salt of some of the same partial ester.

The lead salt was prepared by dissolving 40 parts by weight of the half-ester of Example II in 2,500 parts by weight of hot alcohol. To this was added an excess (40 parts by weight) of lead acetate ($PbAc_2 \cdot H_2O$) dissolved in 100 parts by weight of hot alcohol. The resultant precipitate of lead salt was filtered, washed once with approximately 500 parts by weight of hot alcohol, and evaporated to dryness. The products thus produced had the lead content of 18.15 percent.

The protective composition of the example was then prepared by mixing the following with gentle heating:

| | Parts by weight |
|---|---|
| Stearyl half ester of styrene-maleic anhydride from Example II | 10 |
| Lead salt of a partial ester | 15 |
| Lanolin (anhydrous) | 10 |
| Stearic acid (Neo-fat) | 10 |
| Xylene | 55 |

This product was applied to clean steel surfaces and upon the evaporation of solvent there was a dry adherent coating which was only slightly affected by 200 hours exposure to 20 percent salt spray.

*Example VI*

A protective composition of the invention was prepared by dissolving together the following:

| | Parts by weight |
|---|---|
| Stearyl half ester of styrene-maleic anhydride from Example II | 80 |
| Stearic acid | 40 |
| Anhydrous lanolin | 40 |
| Xylene | 240 |

The mixture was fluid at room temperature, 25° C., and upon application to metals produced a dull, non-sticky film, which gave extremely good protection to the metal.

*Example VII*

A composition was prepared as in Example VI except that lauric acid was used in place of stearic acid. The film produced was slightly tacky but was glossy and gave excellent protection against corrosion.

*Example VIII*

Compositions embodying the same general method of preparation and which have long organic groups as side chains attached to a polymeric material may be prepared by reacting the anhydride polymer with an aliphatic amine, yielding the half amides. Thus octyl, decyl or lauryl amine may be reacted with the anhydride polymer of styrene-maleic anhydride yielding a product of the following general formulae:

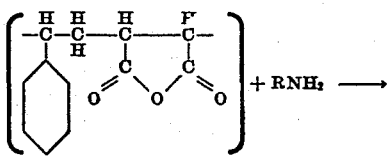 + $RNH_2$ ⟶

These products have the general characteristics of the half esters and have been found to impart protection to metal surfaces to corrosive conditions.

A half lauryl amide was prepared as follows:

To a three necked flask equipped with a stirrer and reflux condenser was added:

| | Grams |
|---|---|
| Lauryl amine | 9.25 |
| Styrene-maleic anhydride heteropolymer | 10.20 |
| Xylene | 150.0 |

This was heated at reflux for 1 and one-half hours at which time an additional 5.0 grams of lauryl amine was added. Refluxing was continued for an additional hour at which time all the solid polymer dissolved and passed into a clear amber colored solution. The solvent was removed by evaporation on a steam bath over night.

A solution of the above half amide was prepared by dissolving together

| | Grams |
|---|---|
| ½ lauryl amide | 10.0 |
| Stearic acid | 2.0 |
| High flash naphtha | 90.0 |

This product when applied to clear bright steel was found to give protection against corrosive conditions.

While certain illustrative compositions and processes have been shown it will be understood that these are illustrative and one may employ numerous processes and make numerous compositions using partial esters of polymeric carboxylic acids without departing from the spirit of this invention.

I claim:

1. A composition for the protection of metal surfaces comprising a half-ester of styrene-maleic anhydride polymer esterified with a saturated monohydric aliphatic alcohol of 12 through 18 carbon atoms, and a solvent for the said ester.

2. A composition for the protection of metal surfaces comprising a half-ester of styrene-maleic anhydride polymer esterified with stearyl alcohol, and a solvent for the said ester.

3. A composition for the protection of metal surfaces comprising a half-ester of styrene-maleic anhydride polymer esterified with stearyl alcohol, said ester being dissolved in a mixture of acetone and toluol.

4. A composition for the protection of metal surfaces comprising a half-ester of styrene-maleic anhydride polymer esterified with a saturated monohydric aliphatic alcohol of 12 through 18 carbon atoms, the composition containing a saturated fatty acid of at least 10 carbon atoms.

5. A composition for the protection of metal surfaces comprising a half-ester of styrene-maleic anhydride polymer esterified with stearyl alcohol, palmitic acid, and a solvent.

6. A composition for the protection of metal surfaces comprising a lead salt of a partial ester of a styrene-maleic anhydride hetero polymer esterified with a saturated aliphatic alcohol of 12 through 18 carbon atoms.

7. In a process for the protection of a metal the step comprising coating the metal with a composition comprising a half-ester of styrene-maleic anhydride polymer esterified with a saturated monohydric aliphatic alcohol of 12 through 18 carbon atoms.

8. In a process for the protection of a metal the step comprising coating the metal with a composition comprising a partial lead salt of a half-ester of a styrene-maleic anhydride hetero polymer esterified with a saturated monohydric aliphatic alcohol of 12 through 18 carbon atoms.

JOSEPH S. KIRK.

REFERENCES CITED

The following references are of record in the file of this patent:

UNITED STATES PATENTS

| Number | Name | Date |
| --- | --- | --- |
| 1,993,026 | Littman | Mar. 5, 1935 |
| 2,187,817 | Hopff et al. | Jan. 23, 1940 |
| 2,254,382 | Neher | Sept. 2, 1941 |
| 2,324,426 | Robie | July 13, 1943 |